United States Patent
Latheef et al.

(10) Patent No.: US 9,824,554 B2
(45) Date of Patent: Nov. 21, 2017

(54) METHOD AND SYSTEM OF ADAPTIVE BUILDING LAYOUT/EFFICIENCY OPTIMIZATION

(71) Applicant: Honeywell International Inc., Morristown, NJ (US)

(72) Inventors: Rinas Abdul Latheef, Mannarkkad (IN); Vibgy Joseph, Tirunelveli (IN); Balaji Bhathey Sivakumar, Madurai (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/924,143

(22) Filed: Oct. 27, 2015

(65) Prior Publication Data

US 2017/0116828 A1    Apr. 27, 2017

(51) Int. Cl.
| | |
|---|---|
| *G08B 13/00* | (2006.01) |
| *G05B 19/00* | (2006.01) |
| *G09B 21/00* | (2006.01) |
| *G08B 13/02* | (2006.01) |
| *G06Q 10/06* | (2012.01) |
| *G06Q 10/04* | (2012.01) |
| *G06Q 50/08* | (2012.01) |
| *G06Q 90/00* | (2006.01) |

(52) U.S. Cl.
CPC .............. *G08B 13/02* (2013.01); *G06Q 10/04* (2013.01); *G06Q 10/06* (2013.01); *G06Q 10/0631* (2013.01); *G06Q 50/08* (2013.01); *G06Q 90/20* (2013.01)

(58) Field of Classification Search
CPC  G05B 2219/2642; G06F 7/023; G06N 5/048; G06N 7/06; G06N 99/005
USPC .......................................... 340/541, 5.1, 5.8
See application file for complete search history.

(56) References Cited

U.S. PATENT DOCUMENTS

| | | | |
|---|---|---|---|
| 5,440,498 A * | 8/1995 | Timm ................. | G08B 29/186 340/541 |
| 6,506,056 B1 * | 1/2003 | DeMedio .............. | G09B 25/04 434/72 |
| 7,725,857 B2 | 5/2010 | Foltz et al. | |
| 2007/0024708 A1 * | 2/2007 | Lin ....................... | H04N 7/181 348/143 |

(Continued)

FOREIGN PATENT DOCUMENTS

CN        1335446 A      2/2002

OTHER PUBLICATIONS

English translation of abstract of CN1335446 (A).
Extended European search report for corresponding EP patent application 16194485.5, dated Jan. 12, 2017.

*Primary Examiner* — Emily C Terrell
(74) *Attorney, Agent, or Firm* — Husch Blackwell LLP

(57) ABSTRACT

A system is provided that includes a tracking system including one or more processors that detect movement of people within a secured geographic area, a movement analysis system including one or more processors that correlate the detected movements of people within geographic locations of a building information model (BIM) of the secured area, and an optimization system including one or more processors that correlate the locations of people with a distance of each movement to provide reports that optimize a location of people or equipment within the secured area based upon the distances and frequencies of movement.

15 Claims, 2 Drawing Sheets

(56) References Cited

U.S. PATENT DOCUMENTS

| | | | |
|---|---|---|---|
| 2007/0219645 A1* | 9/2007 | Thomas | G05B 15/02 |
| | | | 700/29 |
| 2013/0278382 A1* | 10/2013 | Cristache | G07C 9/00111 |
| | | | 340/5.65 |
| 2013/0314210 A1 | 11/2013 | Schoner et al. | |
| 2015/0137967 A1* | 5/2015 | Wedig | G08B 25/016 |
| | | | 340/501 |
| 2016/0004237 A1* | 1/2016 | Mohan | G05B 15/02 |
| | | | 700/275 |

* cited by examiner

METHOD AND SYSTEM OF ADAPTIVE BUILDING LAYOUT/EFFICIENCY OPTIMIZATION

FIELD

This application relates to security systems and, more particularly, to security systems using a building information model for the display of information.

BACKGROUND

Systems are known to protect people and assets within secured areas. Such systems are typically based upon the use of or one more sensors that detect threats within the areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the an area. Intruders have also been known to injure or kill people living within the area.

In the case of intruders, sensors may be placed in different areas based upon respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While conventional security systems work well, they generate large amounts of data that could be used for other purposes. Accordingly, a need exists for better methods and an apparatus for better use of such data.

DETAILED DESCRIPTION

Figure 1:
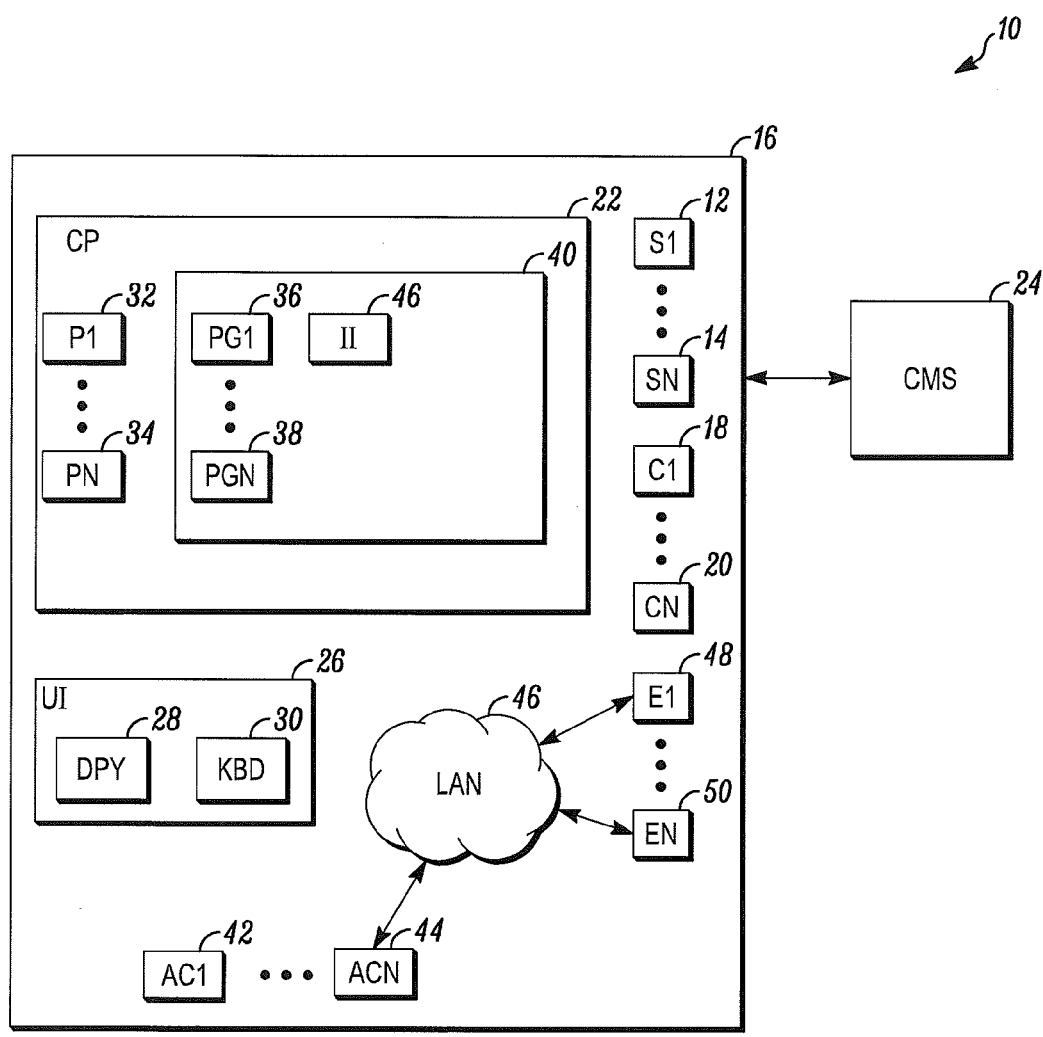
FIG. 1 is a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system are a number of threat sensors 12, 14 that detect threats within a secured geographic area 16. The sensors may be embodied in any of a number of different forms. For example, at least some of the sensors may be limit switches placed on doors and/or windows providing entrance into or egress from the secured area. Other of the sensors may be environmental sensors (e.g., fire, smoke, carbon monoxide, etc.).

The secured area may also be protected by one or more closed circuit television (CCTV) cameras 18, 20. The cameras may be equipped with motion detection and/or face recognition capability.

The sensors and cameras are monitored by a control panel 22. Upon detection of a threat via one of the sensors or cameras, the control panel may send an alarm message to a central monitoring station 24. The central monitoring station may respond by summoning help (e.g., fire department, police, etc.).

The security system may be controlled by a human user through a user interface 26. In this regard, the user may enter a personal identification (PIN) number and activate a function key through a keyboard 30 (e.g., to arm or disarm the system). Status information (e.g., armed, disarmed, etc.) is shown on a display 28.

Included within the control panel, each of the sensors, and the user interface may be control circuitry that accomplishes the functionality described below. For example, the circuitry may include one or more processor apparatus (processors) 32, 34 each operating under control of one or more computer program 36, 38 loaded from a non-transitory computer readable medium (memory) 40. As used herein, reference to a step performed by a computer program is also reference to the processor that executed that step.

For example, a status processor within the control panel may monitor the user interface for instructions from an authorized user. Upon entry of a PIN and/or a function key, the status processor may assume an armed, armed away, or disarmed state.

Similarly, an alarm processor may monitor the status processor. In the armed or armed away states, the alarm processor may monitor the sensors and/or cameras for threats. Upon detection of a threat, the alarm processor may compose and send an alarm message to the central monitoring station. The alarm message may include an identifier of the security system (e.g., an address, account number, etc.), an identifier of a function of the activated sensor or camera, an identifier of the activated sensor or camera and its location, and a time.

The secured area may also include an access control system including one or more access control devices 42, 44. At least some of the access control devices may be card readers placed on doors located along a periphery of the secured area. Other card readers may be located on doors separating areas of the secured area having different levels of security. In this regard, the card readers may be used by authorized users to gain access into the secured area or into different areas of the secured area by swiping a respective access card through a respective card reader. In response, an access processor within the control panel may compare information from the access card with identity information of the user contained in a respective file 46. If the information from the card matches saved information of an authorized user, then the processor activates an electric lock or actuator that opens a door.

Other access control devices may be associated with equipment 48, 50 (e.g., copiers, printers, etc.) located within the secured area. For example, the user may enter his/her PIN into an access control panel and be given access to a copier or other device within the secured area that is separately secured against use. Access to this equipment may be granted via a local area network (LAN) 46. In this regard, the access processor within the control panel monitors usage of the equipment in order to track the location of the authorized users within the secured area.

In the armed away state, the cameras may be used to detect intruders who have broken into the secured area. However, the cameras may also be used in an arm stay state where only the periphery of the secured area is monitored. In the armed stay state, a tracking system may use the cameras along with the access control system to detect and track movements of authorized persons within the secured area. Tracking of the authorized persons, in this case, is used to optimize use of the secured area.

Figure 2:
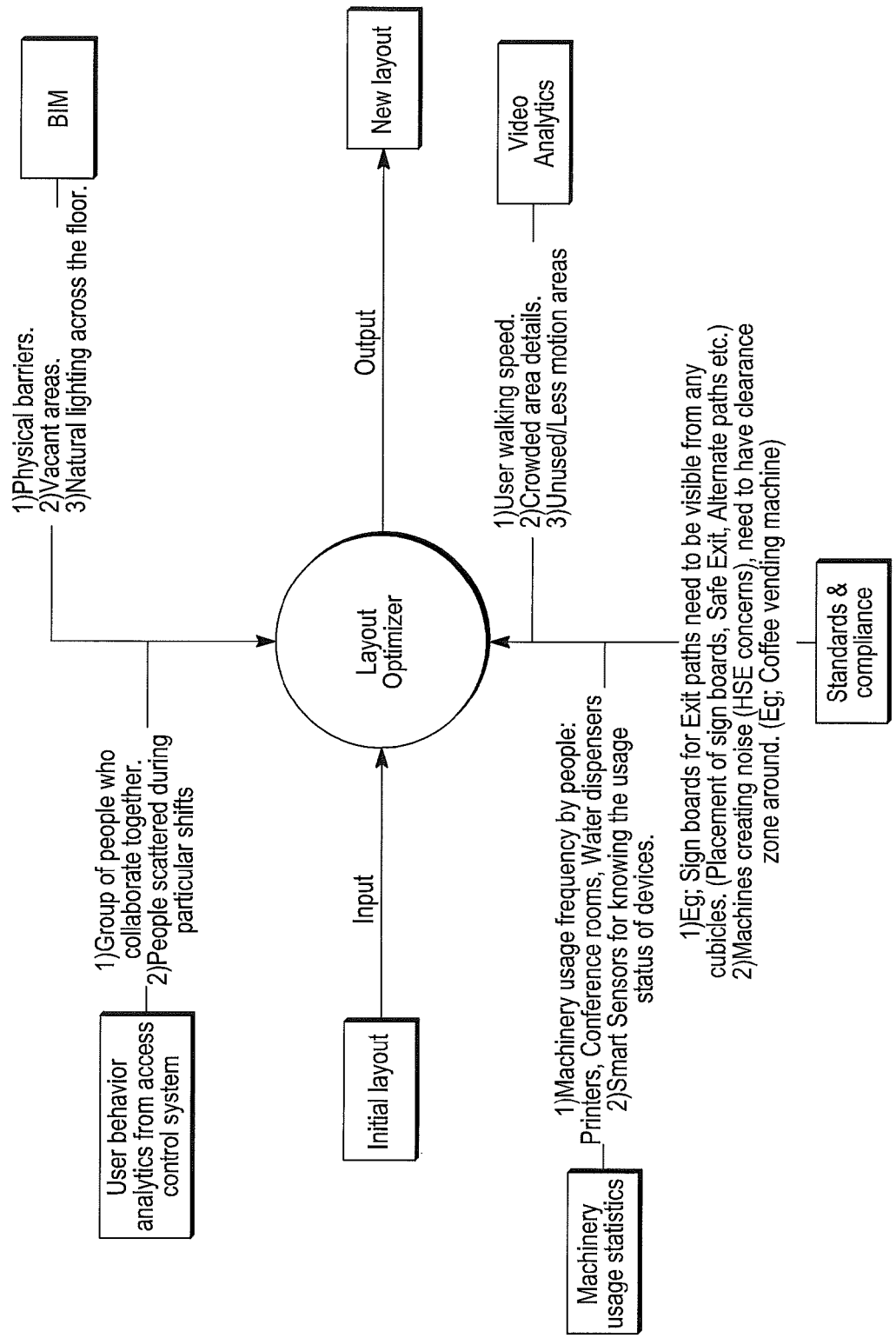
FIG. 2 is a block diagram of information flow of the system of FIG. 1.

In general, optimization of the secured area may involve locations of people and equipment within the secured area. FIG. 2 depicts information flow that may be used for the optimization. Such optimization may be accomplished via the use of one or more of a tracking system, a movement analysis system, a personnel detection system, a use analysis system, and an optimization system. The tracking system includes one or more processors of the control panel that are used in conjunction with the cameras to detect and track personnel within the secured area. In some cases, tracking may be accomplished via the simple detection of movement and tracking of that movement within each field of view of a camera and across the fields of views of multiple cameras. In other cases, a facial recognition processor may analyze and identify authorized personnel in order to better track the movements of individual people throughout the secured area.

The movement analysis system may include one or more processors of the control panel that determine the scope of movement within the secured area. Movement analysis, in this case, does not involve a user sitting at his/her workstation performing his/her regular duties or eating lunch in a cafeteria. Instead, the movement analysis system detects short trips within a building between predefined destinations. Short trips, in this case, may include trips between locations within the secured area having different levels of security and where the trips are detected through the access control system via the entry of a PIN or swiping of a card. In each case, the system determines a length of each of the trips via a distance parameter of the BIM and a frequency of the trips per time period (e.g., per hour, per day, etc.).

Alternatively, the trips may be detected via the camera tracking system. In this case, movement may be detected each time the user enters a hallway and ends when the user exits the hallway into an office or other public area. The system detects a starting and ending point and then determines a length of one of the trips. It may also determine a number of people per time period who make a same one of the trips. Alternatively, a personnel detection system may also use a face recognition system to determine who made each of the trips and how many times those people make the trips per time period.

The use analysis system may include elements of the movement analysis system as well as factors associated with a static placement of machines and fixtures within the secured area. For example, the use analysis system may analyze an orientation of buildings with regard to natural light from the sun to determine an optimal placement and/or orientation of equipment in order to compare the optimal placement with an actual placement and to suggest changes to improve use factors and operation of such equipment. The system may also identify locations of physical barriers (e.g., walls, columns, etc.) and walkways and suggest changes to optimize locations of each. The system may also analyze locations of cubicles of personnel within the area and suggest locations of additional exit signs.

The use analysis system may also identify equipment that operates to create an adverse working environment for people working in an area of the building adjacent the equipment. The adverse environment may be due to heat, noise, or noxious odors. In this case, the system may recommend additional walls, movement of personnel, etc.

In any given building, the equipment, cabins (cubicles), and machines used for everyday business purposes may be placed at non-optimal locations that may cause a great deal of unnecessary movement of people, loss of time, and wasted energy. The planning of a layout for a workspace depends on many factors, such as movement of people inside a space, usage patterns associated with equipment, and of a number of other environmental factors. A highly specialized and niche skill set is required to accomplish the optimization in any workspace. The skill set is a combination of architectural knowledge, engineering skills, and an understanding of statistical models.

A significant amount of human effort is needed to collect data about user interaction with the building as well as the equipment inside the building to optimize use of each. This effort is initially required before any conclusions can be made in order to understand the need for optimization itself. Also, if this exercise reveals the layout is already optimized, then the effort/cost incurred will be wasted. In addition, once the layout is initially established based upon a preliminary guess of optimized use and once a number of people start using the building, very few improvements are added even though the people, projects, equipment usage, etc. change over time.

The system of FIG. 1 combines data gathered by components of the security system, including the access control system, the BIM, video analytics, machinery usage statistics, and standards, to suggest optimal placement of cubicles/workstations, equipment, conference rooms, inventory, lighting, air conditioning outlets, etc. As illustrated in the block diagram of FIG. 2, an optimizer gets an initial layout from the BIM and creates an optimized layout by utilizing inputs/analytics from different systems, such as the BIM, the access control system, the machinery usage statistics, the video analytics, and a standards/compliance engine.

From the access control system, a number of analytics can be derived. First, groups of people who collaborate together can be identified from access cards read and meeting requests. In response, the system can suggest arranging their cabins closer together.

Second, the analytics can identify if a person is frequently using a particular room, for example, a server room or a conference room, and if his cabin is far away from that room, then the system will suggest moving his cabin closer to that server/conference room.

Third, the analytics can be used to identify people who use scattered workplaces during a particular work shift. If only a few people are occupying a floor/building that has additional capacity, then the system suggests grouping them together into the same area/floor to save on lighting and HVAC energy consumption.

From the machine usage statistics, a number of analytics can be obtained and used. For example, machinery frequently used by many people from a specific area/floor can be identified. If the machinery is not in the middle of the area/floor, then the system suggests moving it to an optimal location. If someone is using multiple machines frequently and that person is located far away or closer to only one machine, then the system suggests moving his location to an area that is an optimal distance from all of the machines.

From the video analytics, a number of changes can be identified. First, the system may be used to identify anyone walking slower than an average walking speed, and, in response, the system suggests moving his cabin closer to exits or doors frequently used by that person.

The system can identify places where crowds often develop. The system may suggest removing obstructions from an area and increasing a width of a path way leading to and from the area. The system may also suggest providing appropriate infrastructure (e.g., furniture, water dispenser, writing boards, lighting, etc.) to provide better service to the crowds.

The system can identify locations where little motion or less occupancy is detected. The system may suggest making use of those locations for other purposes (e.g., inventory, pantry, conference room, reading hub, relaxation area, etc.).

The system can identify obstacles confronting crowds in pathways/general motion areas. The system may suggest moving the obstacles.

From the BIM, a number of static analytics can be obtained. For example, the system may identify a direction/area where more natural light enters the building. The system may suggest moving computer screens so that they do not face the incoming light. The BIM may be used to identify obstructions (e.g., building columns, walk ways, aisles, etc.). The system may use these elements as part of the optimization process.

Building standards safety compliance rules may be used to identify other opportunities. For example, the system may identify cabin positions of people, pathways, most frequently used places, etc. and analyze the visibility of persons to, accordingly, place signboards in optimal, most visible locations. The system may identify a working nature of equipment based on noise, heat, gas emission, etc. to understand an annoyance zone around that equipment. The system may suggest placing cabins and workspaces outside the annoyance zone. Alternatively, it may suggest putting insulating walls around the equipment so that a space closer to the equipment can be utilized without unnecessary annoyance.

As previously noted above, the system detects where a few people in a floor are frequently using a server room/printer requiring access card validation for entry and suggests moving those people closer to the server room/printer. The system detects the case where people using a particular printer is widespread in a particular floor and suggest moving the printer to the middle of the floor so everyone is located at an optimal distance to it. It also eliminates the need for placing multiple printers on the same floor, thereby saving cost.

If certain employees' cabins are scattered around a floor (especially during night shifts), all of the lights around them would normally be switched on. The system can be used for optimization, in this case, by first identifying them and then suggesting consolidation by bringing them together in one area to save lighting/air conditioning energy. This can be done on a floor and building level.

The analytics of the system may detect that a water cooler or fire extinguisher kept near a pathway is constantly slowing people in the pathway or that it creates a funneling effect where many people are moving along the pathway and where such an obstruction slows everyone's progress. The system may suggest relocating such obstacles to other recommended places.

The system may detect that a bunch of cabins are sparely used, and the system also detects a situation where there is machinery producing a great deal of noises/heat/gas and that the noises/heat/gas require a clearance zone around the machinery. The system may also suggest moving the machinery to a sparely used area.

The system analyzes the placement of existing fire exit signs and detects a situation where, because of building obstacles, many people don't have the ability to see signboards from their cabins/workspaces. The system may suggest increasing a number of signs at appropriate places.

In general, the system includes a tracking system including one or more processors that detect movement of people within a secured geographic area, a movement analysis system including one or more processors that correlate the detected movements of people within geographic locations of a building information model (BIM) of the secured area, and an optimization system including one or more processors that correlate the locations of people with a distance of each movement to provide reports that optimize a location of people or equipment within the secured area based upon the distances and frequencies of movement.

Alternatively, the system may include a security system that detects threats within a secured geographic area, a personnel detection system including one or more processors that detect movement of people within a secured geographic area, a use analysis system including one or more processors that correlate the detected movements of people within geographic locations of the secured area based upon a building information model (BIM) of the secured area, and an optimization system including one or more processors that correlate the locations of people with a distance of each movement to provide reports that optimize a location of people or equipment within the secured area based upon the distances and frequencies of movement.

Alternatively, the system may include a security system that detects threats within a secured geographic area, a personnel detection system including one or more processors that detect a presence and movement of people within a secured geographic area, a use analysis system including one or more processors that correlate the detected presence and movements of people within geographic locations of the secured area based upon a building information model (BIM) of the secured area, and an optimization system including one or more processors that correlate the locations of people with a distance of each movement or building use factors and that generates reports that optimize a location of people or equipment within the secured area based upon the building use factors or distances and frequencies of movement.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:
1. A system comprising:
   a tracking system that detects movements within a secured geographic area;
   a movement analysis system that receives, from the tracking system, tracking data representing the movements within the secured geographic area and generates user behavior data based on repetitions of the movements in the tracking data; and an optimization system that identifies inefficiencies in a layout of assets within the secured geographic area by comparing (1) data for an initial layout of the assets, (2) official standards for a deployment of the assets, and (3) a building information model of the secured geographic area with (1) usage statistics for the assets and (2) the user behavior data, wherein the optimization system generates an optimized layout of the assets that corrects the inefficiencies in the layout of the assets, wherein the tracking system includes a video analytics system that tracks a first user moving within the secured geographic area, wherein the optimized layout of the assets includes an impaired movement report indicating that an assigned location of the first user should be moved closer to an exit from the secured geographic area, wherein the impaired movement report is based on a speed of the first user detected by the video analytics system relative to a first predetermined threshold value, and wherein the impaired movement report is displayed upon detecting that the speed exceeds the first predetermined threshold value.

2. The system as in claim 1 further comprising a security system that detects threats within the secured geographic area.

3. The system as in claim 1 further comprising an access control system that identifies an authorized user associated with an access request and correlates the access request with a current location within the secured geographic area, wherein the movement analysis system generates the user behavior data based on the access request and the current location.

4. The system as in claim 3 wherein the access control system includes at least one of a building access control system, a conference room access control system, and an equipment access control system.

5. The system as in claim 3 wherein the access control system determines a frequency of the access request and a distance between the current location and the assigned location for the authorized user within the secured geographic area.

6. The system as in claim 5 wherein the optimized layout of the assets includes an excess movement report indicating that the assigned location for the authorized user should be moved closer to the current location, and wherein the excess movement report is based on the frequency of the access request relative to a second predetermined threshold value and is displayed upon detecting that the frequency exceeds the second predetermined threshold value.

7. The system as in claim 1 wherein the optimized layout of the assets includes a personnel flow report that identifies congested areas of the secured geographic area where groups of users consistently gather together and suggests moving obstructions or obstacles away from the congested areas.

8. The system as in claim 1 wherein the optimization system identifies areas of the secured geographic area where natural light enters the secured geographic area and suggests, in the optimized layout, rotating screens to avoid the natural light.

9. A system comprising:
a security system that detects threats within a secured geographic area;
a personnel detection system that detects movement of people within the secured geographic area;
a use analysis system that receives, from the personnel detection system, tracking data representing the movements of the people within geographic locations of the secured geographic area and generates user behavior data based on repetitions of the movements in the tracking data; and
an optimization system that identifies inefficiencies in a layout of assets within the secured geographic area by comparing (1) data for an initial layout of the assets, (2) official standards for a deployment of the assets, and (3) a building information model of the secured geographic area with (1) usage statistics for the assets and (2) the user behavior data,
wherein the optimization system generates an optimized layout of the assets that corrects the inefficiencies in the layout of the assets,
wherein the personnel detection system includes a video analytics system that tracks a first user moving within the secured geographic area,
wherein the optimized layout of the assets includes an impaired movement report indicating that an assigned location of the first user should be moved closer to an exit from the secured geographic area,
wherein the impaired movement report is based on a speed of the first user detected by the video analytics system relative to a first predetermined threshold value, and
wherein the impaired movement report is displayed upon detecting that the speed exceeds the first predetermined threshold value.

10. The system as in claim 9 wherein the personnel detection system includes an access control system that identifies an authorized user associated with an access request and correlates the access request with a current location within the secured geographic area, and wherein the use analysis system generates the user behavior data based on the access request and the current location.

11. The system as in claim 10 wherein the access control system includes one of a building access control system, a conference room access control system, and an equipment access control system.

12. The system as in claim 10 wherein the access control system determines a frequency of the access request and a distance between the current location and the assigned location for the authorized user within the secured geographic area.

13. The system as in claim 12 wherein the optimized layout of the assets includes an excess movement report indicating that the assigned location for the authorized user should be moved closer to the current location, and wherein the excess movement report is based on the frequency of the access request relative to a second predetermined threshold value and is displayed upon detecting that the frequency exceeds the second predetermined threshold value.

14. The system as in claim 9 wherein the video analytics system includes a face recognition system that tracks an identity of the first user of the secured geographic area.

15. The system as in claim 9 wherein the optimized layout of the assets includes a personnel flow report indicating congested areas of the secured geographic area where groups of users consistently gather together and suggests moving obstructions or obstacles away from the congested areas.

* * * * *